Jan. 13, 1959 H. S. HEMSTREET ET AL 2,868,450

DECIMAL TO BINARY TRANSLATOR

Filed Nov. 19, 1954 5 Sheets-Sheet 1

HAROLD S. HEMSTREET
HOMER D. ECKHARDT
INVENTORS

BY Richard G. Stephens
ATTORNEY

Jan. 13, 1959 H. S. HEMSTREET ET AL 2,868,450

DECIMAL TO BINARY TRANSLATOR

Filed Nov. 19, 1954 5 Sheets-Sheet 2

HAROLD S. HEMSTREET
HOMER D. ECKHARDT
INVENTORS

BY Richard D. Stephens

ATTORNEY

Jan. 13, 1959 H. S. HEMSTREET ET AL 2,868,450

DECIMAL TO BINARY TRANSLATOR

Filed Nov. 19, 1954 5 Sheets-Sheet 3

HAROLD S. HEMSTREET
HOMER D. ECKHARDT
INVENTORS

BY Richard G. Stephens
ATTORNEY

HAROLD S. HEMSTREET
HOMER D. ECKHARDT
INVENTORS

BY Richard G. Stephens
ATTORNEY

Jan. 13, 1959 H. S. HEMSTREET ET AL 2,868,450

DECIMAL TO BINARY TRANSLATOR

Filed Nov. 19, 1954 5 Sheets-Sheet 5

HAROLD S. HEMSTREET
HOMER D. ECKHARDT
INVENTORS

BY Richard G. Stephens
ATTORNEY

United States Patent Office 2,868,450 Patented Jan. 13, 1959

2,868,450

DECIMAL TO BINARY TRANSLATOR

Harold S. Hemstreet, Binghamton, N. Y., and Homer D. Eckhardt, Cambridge, Mass., assignors to Link Aviation, Inc., Binghamton, N. Y., a corporation of New York Application November 19, 1954, Serial No. 469,904

10 Claims. (Cl. 235—61)

This invention relates to a method and means of decimal to binary conversion or translation and more specifically to devices into which multi-digit decimal numbers may be entered to be translated automatically to their equivalent binary notation. The use of binary numbers has found wide application in digital computing, control and instrumentation problems, and since few human operators can conveniently think or calculate in terms of binary digits, it becomes desirable to provide a simple method and automatic means for rapidly converting decimal numbers to their binary equivalents. For example, some calculating machines utilized for accounting purposes utilize cards bearing indicia punched into the cards in binary form. In order to operate a punching machine to punch such cards conveniently, it is desirable that quantities expressed decimally, as in dollars and cents, be translated to equivalent binary digits.

A general binary number N may be expressed as follows:

$$N=A_n2^n+A_{n-1}2^{n-1}+\ \ldots\ A_32^3+A_22^2+A_12+A_0$$

If this number is divided by two, the quotient obtained will be:

$$\frac{N}{2}=A_n2^{n-1}+A_{n-1}2^{n-2}+\ \ldots\ +A_32^2+A_22+A_1+A_{0/2}$$

It will be seen that this quotient will be an integer if $A_0$ was 0. If, however, $A_0$ had been 1, the quotient would have a remainder of ½. If the $A_{0/2}$ term is dropped from the quotient and the other terms of the quotient are then divided again by two, the following quotient will be obtained:

$$\tfrac{1}{2}\left(\frac{N}{2}-\frac{A_0}{2}\right)=A_n2^{n-2}+A_{n-1}2^{n-3}+\ \ldots\ +A_32+A_2+\frac{A_1}{2}$$

It will be seen that the above quotient will be an integer if $A_1$ was 0, but will have a remainder of ½ if $A_1$ was 1. From the above procedure, a method may be deduced for translating a decimal number into binary form.

(1) Divide the original decimal number by 2, maintaining the quotient in decimal form and noting whether the quotient has a remainder. If there will be no remainder the lowest order binary digit is 0; if there will be a remainder, the lowest order binary digit is 1.

(2) Disregarding any remainder, divide the quotient by two, maintaining the second quotient in decimal form and noting whether or not the second quotient will have a remainder. If the second quotient will have a remainder, the second binary digit will be 1; if not, the second binary digit will be zero.

If such a procedure is repeated until the final quotient becomes zero, all the binary digits of the original decimal number will have been determined. The above method may be further refined as follows:

(3) In dividing each second or higher order decimal digit by two, do not carry remainders in the conventional manner by adding ten to the next lower order dividend digit, but instead add five to the next lower order quotient digit. The invention to be described performs the above operations rapidly and automatically.

Prior art devices are known in which successive division by two is utilized to accomplsh decimal to binary translaton. As an example, Patent No. 2,647,689, granted August 4, 1953, to Bowyer et al. shows a decimal to binary conversion apparatus in which the original decimal digits are each immediately translated into binary coded decimal form and then all succeeding divisions by two are performed in binary arithmetic. In the present invention the original decimal number is read into the computing system in decimal form, and as succesive divisions by two are accomplished, the quotients are maintained in decimal form. By utilization of this latter method, the wiring of the machine is considerably simplified, and no components in the divisions circuitry need be provided for the sole purpose of storage. In the abovementioned patent a large number of the relays used therein are provided merely for storage of digits while another group of relays computes the quotient. In the present invention, a "carry-over" system which is instantaneous is employed. Although division of an odd digit by two would conventionally carry over a "ten" to the next lower order digit before division by two, the invention instead adds "five" to the next lower order quotient digit as a simultaneous part of the halving operation, all decimal digits being halved simultaneously. The simplified circuitry of the present invention also facilitates testing and repair of the machine.

It is therefore an object of the invention to provide improved method and means for translating from decimal notation to equivalent binary notation.

It is another object of the invention to provide improved method and apparatus for translating numbers from decimal to binary notation by successive halving while maintaining each digit in decimal form.

It is a further object of the invention to provide improved decimal to binary conversion apparatus having simplified circuitry so as to facilitate construction, testing and repair.

It is an additional object of the invention to provide decimal to binary conversion apparatus utilizing readily-available circuit components, and to eliminate delicate apparatus such as vacuum tubes from the circuits.

It is yet another object of the invention to provide improved decimal to binary conversion apparatus in which carry-over is accomplished simultaneously with successive halving operations.

It is another object of the invention to provide improved decimal to binary conversion apparatus utilizing a novel disabling circuit to eliminate useless operation of higher order digit apparatus.

Other objects of the invention will in part be obvious and will in part appear hereinafter.

The invention, accordingly comprises the several steps and relation and one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which.

Figure 3:
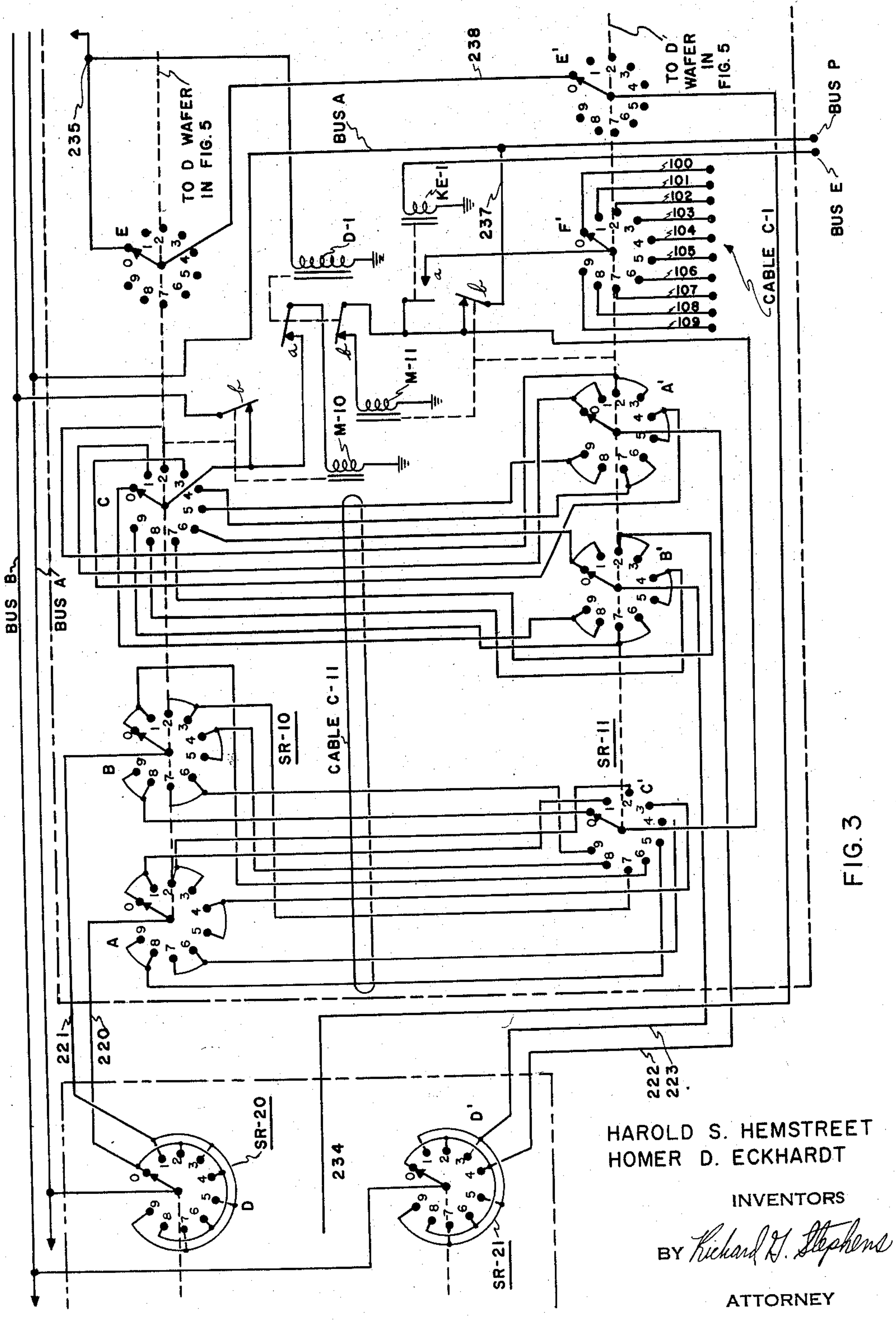
Figure 4:
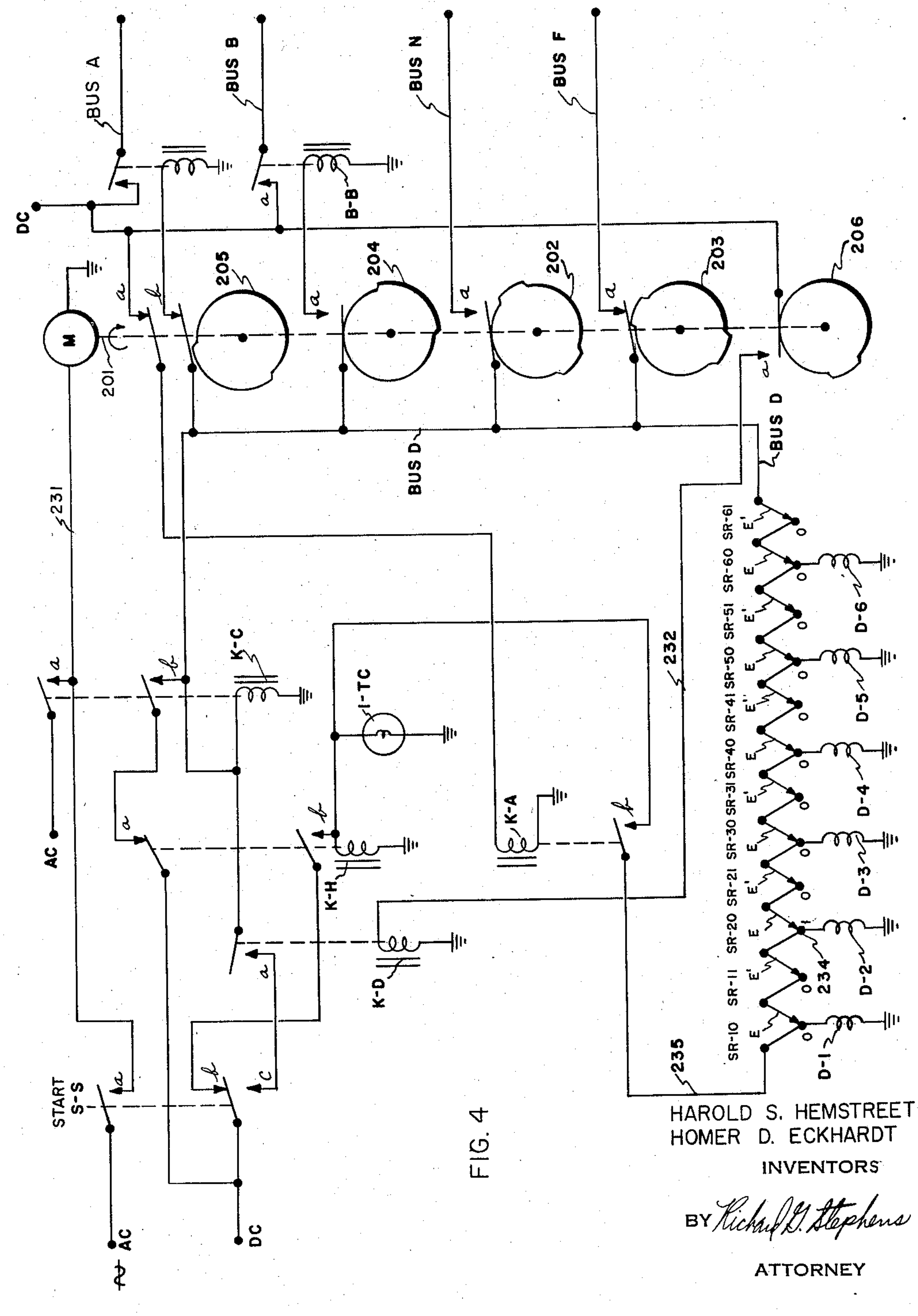
Figure 5:
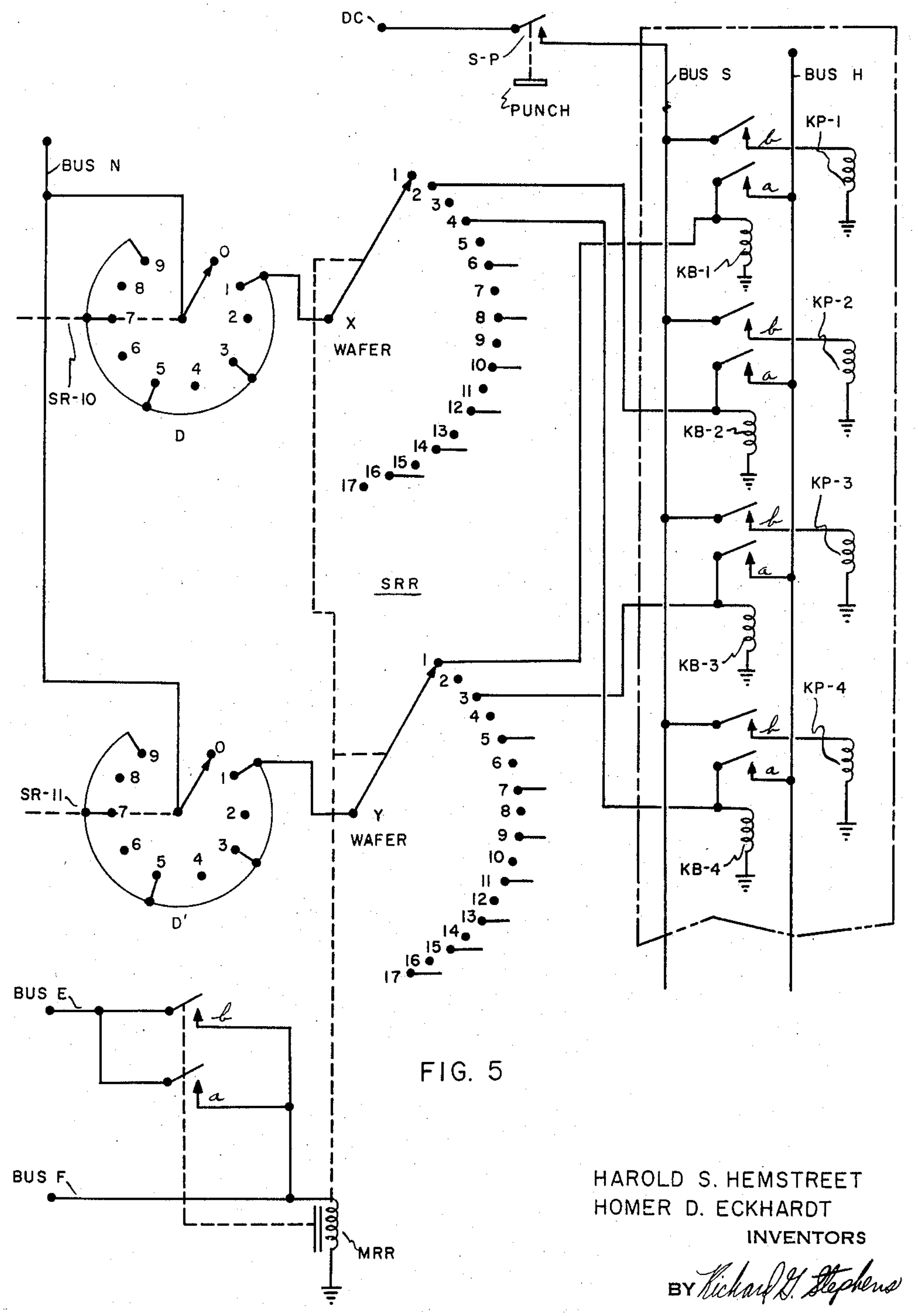

Fig. 3 is an electrical schematic diagram of a portion of the first decimal digit translating circuit, showing how a pair of multi-pole selective switching devices may be interconnected to perform successive divisions by two, and also showing how each translating circuit may be connected to its adjacent higher order translating circuit to provide "carry-over" simultaneously with division;

Fig. 4 is an electrical schematic diagram of the timer portion of the apparatus, also showing a novel disabling circuit which prevents useless halving of zeroes;

Fig. 5 is an electrical schematic diagram of the "read-out" portion and the output portion of the invention.

Figure 1:
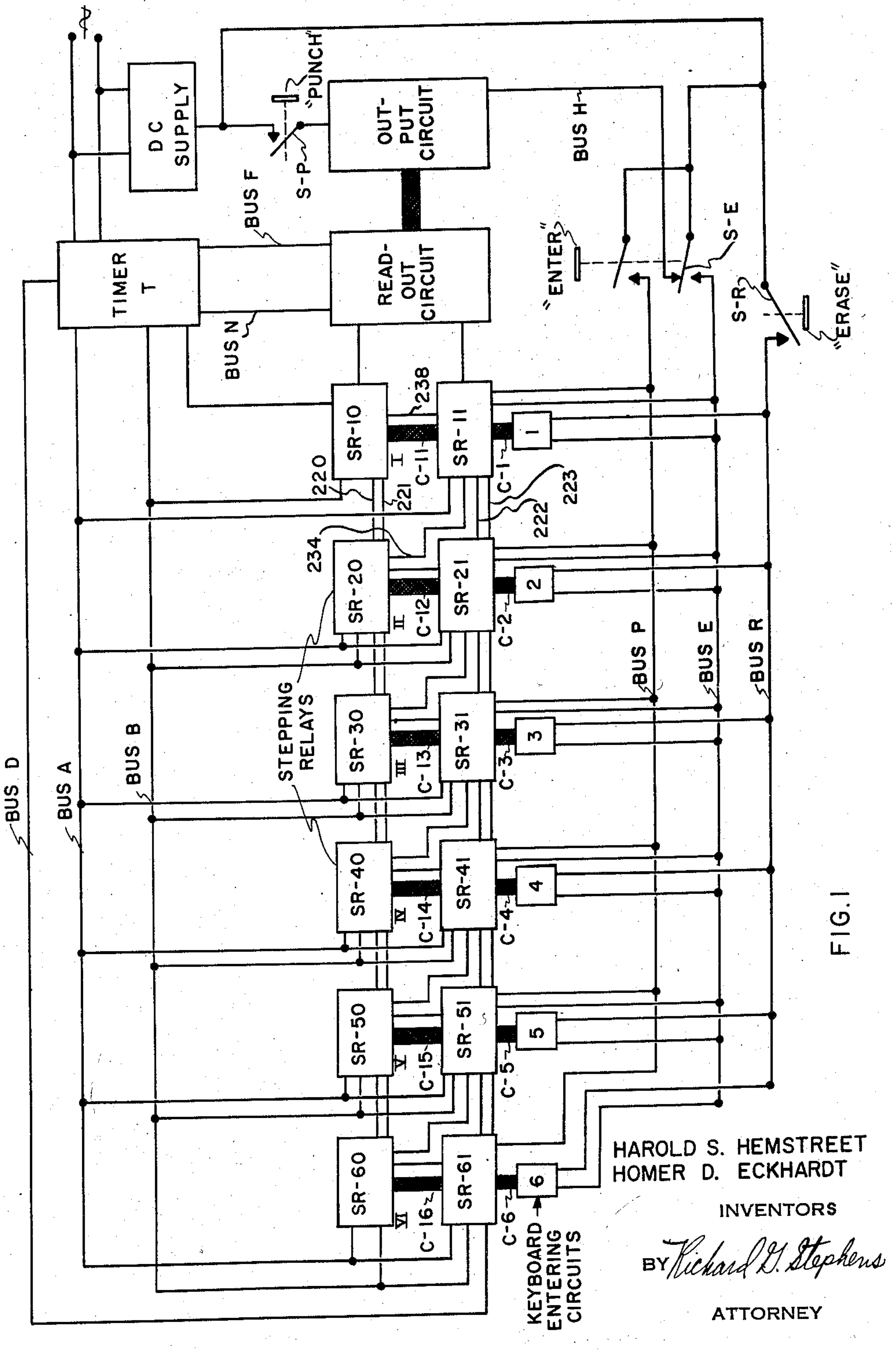
Fig. 1 is an electrical schematic diagram of a six decimal-digit form of apparatus constructed according to the invention, showing the general electrical arrangement of parts, in which portions of the apparatus are shown in block diagram form for sake of clarity.

Referring to Fig. 1 there is shown in block diagram form a translator constructed according to the invention which is capable of handling a six digit decimal number. The small blocks designated by arabic numerals 1 to 6 each comprise a decimal digit entering circuit similar to that shown within dashed lines in Fig. 2, and the apparatus indicated by each block is used for entering one decimal digit. Accordingly, keyboard switches numbered from one to nine are provided for each block (1 to 6) of Fig. 1. The keyboard switches may be arranged physically as on conventional calculating machines, with the numbers 1 to 9 of each decimal order aligned in a vertical row, for example. Thus the circuitry of block 1 will contain keyboard switches (S–1 to S–9 in Fig. 2) for entering a "units" digit, the circuitry of block 2 will comprise keyboard switches (S–10 to S–19, not shown) for entering a "tens" digit, etc. To enter a six digit decimal number, one of the keyboard switches of each decimal digit entering circuit (1 through 6 of Fig. 1) is depressed. Associated with each decimal digit entering circuit (blocks 1 to 6) and connected thereto by cables C–1 through C–6 is a pair of multi-position selective switching devices, comprising stepping relays, each pair in Fig. 1 being designated by a Roman numeral corresponding to the arabic numeral of its respective decimal digit keyboard entering circuit. The function of each decimal digit keyboard entering circuit is to actuate the lower stepping relay of its associated pair to a position corresponding to the decimal number entered on the keyboard. A timing circuit designated symbolically in Fig. 1 and shown in detail in Fig. 4 applies voltages on busses A, B, N and F in a particular sequence, accomplishing successive divisions by two. A "read-out" circuit indicated generally in block diagram form in Fig. 1 and shown in detail in Fig. 5 senses whether a remainder exists during each division, and actuates an indicating or output circuit, shown symbolically in Fig. 1 and also shown in greater detail in Fig. 5.

Figure 2:
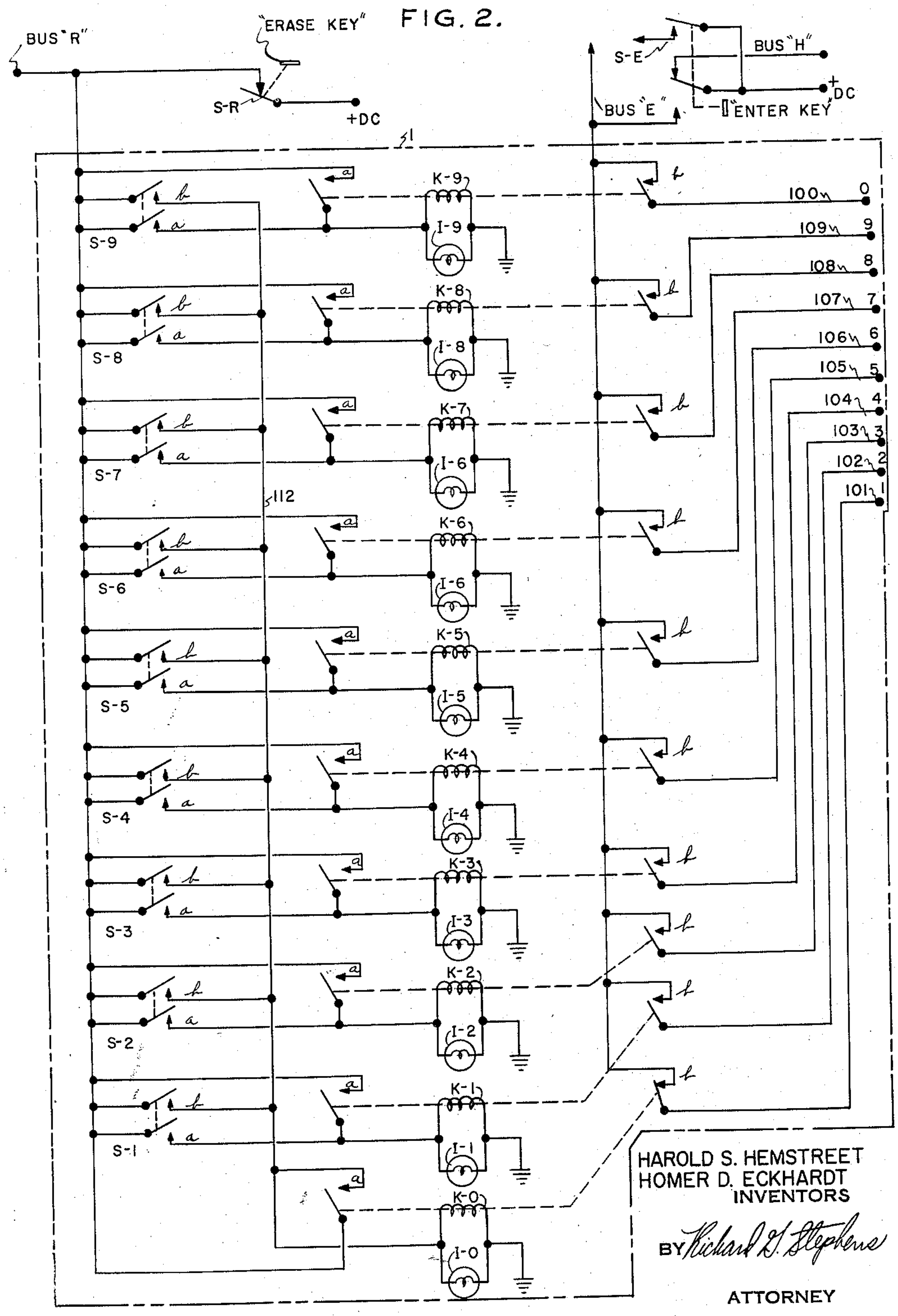
Fig. 2 is a detailed electrical schematic diagram showing the keyboard decimal digit entering circuit (No. 1 of Fig. 1) for entering the "units" decimal digit. Circuits similar to that shown within dashed lines in Fig. 2 are also provided for entering each higher order decimal digit.

Referring now in greater detail in Fig. 2 there is shown schematically the decimal digit keyboard entering circuit (block 1 of Fig. 1) used for entering the lowest order decimal digit of the number to be translated, which digit may be referred to for convenience as the "units" digit. Voltage is applied from a direct voltage power supply through normally closed switch S–R (which may be actuated by an "Erase" key provided upon the keyboard) to excite bus R. Connected to bus R are two contacts each of nine keyboard-operated momentary-contact switches S–1 to S–9, one of which will be actuated by the operator to enter a particular "units" digit of the particular decimal number to be translated. Assume that the "units" digit to be entered is "seven." When switch S–7 is actuated, its lower contact "*a*" applies voltage to energize relay K–7. Energization of relay K–7 closes its normally open contact "*a*," establishing a "seal" or holding circuit around switch S–7 so that relay K–7 will remain energized when the operator releases switch S–7. Indicator lamps (such as I–1 to I–9) may be provided adjacent each keyboard switch or elsewhere to be illuminated whenever their respective keys have been depressed.

Energization of relay K–7 also will have closed its contact "*b*," preparing a circuit to energize conductor 108 later when the keyboard "Enter" key switch S–E is actuated. Actuation of switch S–7 will have also closed its contact "*b*," energizing relay K–0, which will close its contact "*a*" and maintain itself energized. It may be seen that operation of any one of the units digits switches (S–1 to S–9) will energize conductor 112 and relay K–0, to open the normally closed contact "*b*" of relay K–0. Hence it will become apparent that conductor 101 will receive a voltage from bus E whenever the "Enter" key switch S–E is operated, unless any one of the numbered switches (S–1 to S–9) has been actuated. In this manner, a "zero" is automatically entered unless a different number has been entered. All of the other number "units" key switches operate in an identical manner to the operation set forth above for switch S–7. Hence it may be seen that operation of any "units" key switch functions to energize a particular one of conductors 100 to 109. Circuits similar to that shown within the dashed lines of Fig. 2 are provided for each decimal digit to be set into the machine, the keyboard switches of the succeeding circuits being connected in like manner to bus R, and the "*b*" contacts of the relays of the succeeding circuits being connected in like manner to bus E. Hence it will be seen that depression of a number key in each of the decimal digit keyboard circuits will serve to energize a particular conductor in each circuit when the enter key is later actuated. The ten conductors from each decimal digit entering circuit are connected to the lower stepping relay of their associated stepping relay pair by means of ten conductor cables indicated as C–1 through C–6 in Fig. 1.

The energized conductors from each keyboard entering circuit will serve to position the stepping relay to a position corresponding to the number selected. For example, depression of switch S–7 will serve to position stepping relay SR–11 to its "seven" position later when the "Enter" key is depressed by the operator to actuate switch S–E.

Referring to Fig. 3 there is shown in detail within dashed lines an electrical schematic diagram of a portion of the lowest order or "units" digit stepping relay group (I of Fig. 1). The stepping relays utilized have ten contact positions per level. While stepping relays having an eleventh inactive contact position have been more extensively utilized in practising the invention because such relays constitute standard telephone components, relays having no inactive positions are shown herein for sake of clarity and convenience in explanation. It will be readily apparent to those skilled in the art that stepping relays having an inactive position (such as Automatic Electric Type 44) may be substituted for those shown with minor modifications and without departing from the invention. Each stepping relay has an actuating electro-magnet and a plurality of "wafers" or levels. As the actuating electromagnet of the relay is energized, a ratchet-pawl mechanism is positioned against the force of a spring, and upon de-energization of the electromagnet, the ratchet-pawl translates the selector arm of each wafer (counter-clockwise as shown in Fig. 3) to the next lower number contact position. Throughout the disclosure the corresponding contacts of each wafer of a stepping relay are numbered similarly, so that on any one stepping relay the selector arms of all wafers are positioned to the same number contact at any one time. Each stepping relay is also provided with a self-interrupting contact *b* to be wired in series with the relay actuating coil, so that energization of the coil will rapidly thereafter disconnect the coil, thereby translating the wiper arm one position, and then closing the self-interrupting contact immediately to re-cycle. Since such stepping relays are well known in the electrical arts, a detailed showing of their structure is believed to be unecessary.

It will be seen that the stepping relay group I for the "units" digit comprises two stepping relays SR–10 and SR–11. Upper stepping relay SR–10 shown in the upper portion of Fig. 3 has an actuating coil M–10 which drives the selector arms around on five wafers A, B, C, D and E. Lower stepping relay SR–11 shown in the lower portion of Fig. 3 has an actuating coil M–11 which drives the selector arms around on six wafers A′, B′, C′, D′, E′ and F′. For sake of clarity, the connections on the D wafer of stepping relay SR–10 and the connections to wafer D′ of stepping relay SR–11 are not shown in Fig. 3 but will be shown in Fig. 5 and will be explained below. It will be understood that each higher order stepping relay group also comprises two stepping relays which may be similar to relays SR–10 and SR–11, and these higher order stepping relays are designated in Fig. 1 as SR–20 and SR–21, SR–30 and SR–31, SR–40 and SR–41, etc.

Referring again to Fig. 3, it will be seen that conductors 100 to 109 of cable C–1, one of which may be energized upon entry of a "units" digit (as explained above in connection with Fig. 2) are connected to the contacts of wafer F′ of stepping relay SR–11. It will be recalled that conductor 108 was prepared to be energized later (upon actuation of the "Enter" key) by depression of switch S–7. Each of the higher order decimal digit keyboard entering circuits 2 through 6 (comprising apparatus identical to the apparatus of Fig. 2) are similarly connected to the F′ wafer of the lower stepping relay of its associated pair of stepping relays. For example, the conductors of cable C–2 leading from the second order decimal digit entering circuit (2 of Fig. 1) would be connected to the F′ wafer of stepping relay SR–21, and the conductors of cable C–3 leading from the decimal digit entering circuit for the third order decimal digit (3 of Fig. 1) would be connected to the F′ wafer of stepping relay SR–31, etc. Connections are made from the decimal digit keyboard entering circuits to the F′ wafers so that depression of a given number key subsequently will energize the contact on the F′ wafer corresponding to one number higher, or one position clockwise from the key number. As will be further explained and exemplified below, this will cause the stepping relay to "home" to a position corresponding to the number selected, since the relay will advance one position lower (counter-clockwise) past the F′ wafer contact which has been energized.

Shown at the left hand portion of Fig. 3 within dashed lines are two wafers D and D′ of the succeeding higher order, or "tens" digit stepper relays SR–20 and SR–21, respectively. Each succeeding higher order group of stepping relays has its D and D′ wafers connected to the adjacent lower order stepping relays in a similar fashion. It will be seen that the D and D′ wafers SR–20 and SR–21 are connected to the A, B and A′, B′ selectors of SR–10 and SR–11, respectively, by means of conductors 220, 221, 222, and 223. These connections provide instantaneous carry-over of a "five" if a second order decimal order is "odd," to the next lower or first order quotient digit. Since there will be no carry-over to the highest order stepping relay group (SR–60 and SR–61) B and B′ wafers need not be furnished on these stepping relays. The lower stepping relay of each pair is connected to its mate by means of a 20-conductor cable, as indicated generally by cable C–11 through C–16 in Fig. 1. The detailed connections of cable C–11 are shown in Fig. 3, and it will be understood that the higher order stepping relays are similarly interconnected.

The busses A and B shown in Fig. 1 will be periodically and sequentially energized as will be explained below by a timing means indicated in block form in Fig. 1, and shown in detail in Fig. 4. Alternate energization of busses A and B serves to translate or rotate each stepping relay to a position corresponding to a number one half as great as the number represented by the position of its mate. When the number being divided by two becomes equal to "zero," a disabling relay permanently disables the associated stepping relays (if all higher order numbers are also "zero"), so that useless operation of the relays to halve "zeroes" is prevented.

Shown in block form in Fig. 1 and in detail in Fig. 5 is a "read-out" circuit which determines whether a remainder exists during each division by two. Also shown in Fig. 5 is a two-wafer read-out stepper relay SRR having at least as many positions on each wafer as there will be binary digits in the largest number to be handled in the translator. An Automatic Electric Type 45 relay having 50 contact positions and one "off the bank" position may be conveniently utilized as relay SRR in practising the invention. Connections are made from each "even" number contact of the X wafer and from each "odd" number contact of the Y wafer of relay SRR to individual relays of the output and indicating circuit, shown partially in Fig. 5. In the output circuit a KB and a KP relay are provided for each binary digit. For sake of clarity only a few of the contacts of relay SRR and only a few of the output relays have been shown. It will be understood as the description proceeds that the relays connected to the odd number contacts of wafer Y will be energized if the corresponding binary digit is 1, and will remain unenergized if their corresponding binary digit is "zero." The output relays connected to the X wafer (KB–2 and KB–4, etc.) function similarly, to be actuated if their corresponding binary digit is "one" or to remain unenergized if their corresponding binary digit is "zero."

Shown in block form in Fig. 1 and in detail in Fig. 4 is the timing and control apparatus which functions to switch bus voltages and to start and stop the machine. After the operator has pushed the "Entry" switch S–E and the lower stepping relay associated with each decimal digit entering circuit has translated to a position corresponding to the selected decimal digit, the operator depresses "Start" switch S–S, which also may be located on the keyboard. Closure of contact "*c*" of switch S–S applies direct voltage to contact "*a*" of relay K–D. Closure of contact "*a*" of switch S–S applies alternating voltage through conductor 231 to timing motor M, causing motor M to rotate, driving cams 205, 204, 202, 203 and 206 clockwise as shown in Fig. 4. As contact "*a*" on cam 205 opens, it deenergizes relay K–A, opening contact "*b*" of relay K–A, thereby disconnecting stopping relay K–H and "Translation Complete" indicating lamp I–TC. When all of the stepping relays have translated to their zero positions (which will be at the end of a translation operation), voltage from bus D will be applied to the stopping relay K–H at the moment when cam 205 closes its switch "*a*," energizing relay K–A. Hence it will be seen that motor M will always stop in the position shown in Fig. 4, it being understood that motor M may not coast appreciably. Energization of stopping relay K–H opens its normally closed contact "*a*," interrupting the holding circuit to relay K–C, thereby deenergizing relay K–C, which will remove alternating voltage from motor M and direct voltage from bus D. During the translation operation, disabling relays D–6 through D–2 will be successively energized. For example, when the E and E′ wafers of stepping relays SR–60 and SR–61 are both in their zero positions, voltage from bus D will be applied to relay D–6, which serves to disconnect permanently the coils of stepping relays SR–60 and SR–61, preventing further rotation of these relays. The contacts circuit of "units" digit disabling relay D–1 is shown in Fig. 3, and it will be understood that each of the disabling relays is connected similarly to its associated stepping relay pair. Since energization of disabling relay D–1 occurs simultaneously with energization of stopping relay K–H (at the end of the translating cycle) it will become apparent to those skilled in the art that disabling relay D–1 may be omitted, if desired.

Referring again to Fig. 4, it will be seen that while cycling motor M rotates during the translating operation, it drives cam shaft 201, revolving cams 202 through 206. It will be recalled that motor M always stops in the position shown in Fig. 4, so that the contacts of cam 205 have just closed. After the "Start" switch S–S has been depressed and motor M has rotated and relay K–C has been energized, energizing bus D, rotation of the cams by motor M will energize busses A, B, N and F according to the following schedule:

| Rotation | Contacts Closed | Bus Energized |
|---|---|---|
| 0°–112° | contacts of cam 205 | A |
| 112°–135° | contact of cam 206 | D |
| 135°–157° | contact of cam 202 | N |
| 157°–180° | contact of cam 203 | F |
| 180°–292° | contact of cam 204 | B |
| 292°–315° | all contacts open | |
| 315°–337° | contact of cam 202 | N |
| 337°–360° | contact of cam 203 | F |

Thus it will be seen that the sequence of energization of busses by reason of rotation of timing motor M is: NFBNFANFBNFA, etc.

It will be recalled that prior to operation of "Start" switch S–S, the operator has positioned the lower stepping relay of each stepping relay group to a position corresponding to a particular decimal digit, by depression of the "Enter" key and entry switch S–E. Energization of bus N will serve to sense whether each lowest order digit is odd or even, and then energization of bus F will serve to advance the readout relay SRR to a suitable position to determine the next following binary digit. Energization of bus B then causes the upper stepping relays to position themselves to positions corresponding to one half of the number represented by the positions of the lower stepping relays. Energization of bus N then serves to sense whether the position of stepping relay SR–10 represents a number that is odd or even, and energization of bus F then advances read-out relay SRR to determine the next further following binary digit. Energization of bus A then serves to position the lower stepping relays at positions corresponding to one half of the number represented by the positions of the upper stepping relays. Hence it will be seen that alternate energization of busses B and A serves to halve successively the decimal numbers, and during each halving operation energization of bus N determines whether or not a remainder exists (whether or not the lower order digit is odd or even), and read-out relay SRR actuates the output circuit accordingly.

Motor M may rotate cam shaft 201 at any desired speed, as for example at 75 R. P. M., so that the program set forth above may be completed in approximately 8/10 of a second. Maximum permissible speed will depend upon the speed of the stepping relays utilized. The two portions of the program in which neither of the busses A, B, N or F are energized are provided in order to insure that the stepping relays have had time to "home" before bus N is energized to read the result. Since relay K–C is made through a holding circuit throughout the translating operation, it will be seen that opening and closing of relay K–D by the switch of cam 206 has no effect after the translating operation has begun. The purpose of cam 206 and relay K–D is merely to insure that bus N is the first bus to be energized upon starting any translating operation. It will become apparent that while I have shown a specific timing means to energize the busses in a particular sequence, many alternative and equivalent timing means will become apparent to those skilled in the art, in light of our disclosure.

For a better understanding of the invention, a translating operation will now be described. Assume that the decimal number to be translated into binary form is 000057. The "five" and "seven" switches of the second and first order decimal digit entering circuits (2 and 1 in Fig. 1) are depressed, closing a relay in each of these decimal digit entering circuits to prepare two particular conductors (1 in each of cables C–1 and C–2) for energization when the "Enter" switch S–E is actuated, as described above in connection with Fig. 2. Since no keys will have been depressed in the third or higher order decimal digit entering circuits, conductors corresponding to a "zero" count will be automatically prepared in each of those circuits. It may be noted that it is not necessary to depress the keyboard number switches in any particular sequence. For example, in the problem described above, it is not necessary that the "tens" digit "5" key be depressed before the "units" digit "7" key, or vice versa.

When all the desired decimal digit switches have been depressed, the operator then depresses the "Enter" key switch S–E, energizing bus E and bus P. Energization of bus P serves to apply voltage through the self-interrupting contact "*b*" of lower stepping relay SR–11 through the normally-closed contact "*b*" of disabling relay D–1 to the coil M–11 of the lower stepping relay SR–11, serving to energize the coil of M–11 of the stepping relay. The stepping relay SR–11 will thereby be rotated rapidly counterclockwise as shown in Fig. 3. Energization of bus E energizes relay KE–1, closing its normally-open contact "*a*," connecting the selector arm of the F′ wafer of stepping relay SR–11 to the coil M–11 through the normally-closed disabling contact "*b*" of relay D–1. As has been explained above, selection of a lowest order "seven" decimal digit will have energized conductor 108 of cable C–1. Hence it will be seen that when stepping relay SR–11 rotates to its "8" position, voltage from conductor 108 will be applied through contact "*a*" of relay KE–1 to the coil M–11 of stepping relay SR–11, by-passing the self-interrupting contact "*b*" of stepping relay SR–11 and temporarily halting stepping relay SR–11. Next, as the operator releases the "Enter" key and opens the contacts of switch S–E, de-energizing busses E and P, the coil M–11 of stepping relay SR–11 will become de-energized, and since the stepping relay rotates upon de-energization, the relay will advance one more position counterclockwise to rest upon its "7" position. Hence it will be seen that stepping relay SR–11 has been positioned to its "7" position in accordance with the number selected upon the keyboard. Since each of the higher order circuits operate in a similar manner, numbers entered in the keyboard for each of the higher order decimal digits will similarly position the lower stepping relay in accordance with the number selected. Hence, in the above example, stepping relay SR–11 will then remain at rest in its "seven" position, and stepping relay SR–21 will remain in its "five" position. Each of the higher order lower stepping relays will remain in their "zero" positions.

Next, as the operator presses the "Start" switch S–S of Fig. 4, motor M begins to rotate, and as explained above, bus N is first energized. Energization of bus N (Fig. 5) will apply voltage through the selector arm and contact 7 of wafer D′ of stepping relay SR–11 to the selector arm and contact 1 of wafer Y of read-out stepping relay SRR, thereby energizing relay KB–1, which indicates that the first order binary digit is "1." Energization of relay KB–1 closes its normally-open contacts "*b*" and "*a*," furnishing a holding circuit for relay KB–1, and preparing relay KP–1 for energization when bus S is later energized.

Continued rotation of motor M and shaft 201 next causes 203 (Fig. 4) to close and then open its normally open contact A, applying a pulse on bus F to the coil MRR of relay SRR, advancing this relay one position clockwise to its number "2" position. Next, cam 204 will close its contact "*a*," energizing relay B–B, which closes its contact "*a*," energizing bus B. Energization of bus B applies voltage through the self-interrupting contact "*a*" of each upper stepping relay to the operating coil of each stepping relay. For example, energization of bus B applies voltage through self-interruping contact "*b*" of stepping relay SR–10 through the normally-closed contact "*a*" of disabling relay D–1 to energize coil M–10 of stepping relay SR–10. Energization of bus B also applies voltage through the D′ wafer of each adjacent higher-order lower stepping relay through the A′ or B′ wafer of the lower stepping relay to the C wafer of the upper stepping relay, and thence to the stepping relay coil. In the example given, bus B voltage is applied to the selector arm of the wafer D′ of lower stepping relay SR–21 (which is positioned in its "5" position) through conductor 223 to the selector arm of wafer B′ of stepping relay SR–11. It may be noted that if stepping relay SR–21 had been positioned to an "even" number position rather than an "odd" number position, bus B voltage would have been applied instead through conductor 222 to the A′ wafer of stepping relay SR–11. Since stepping relay SR–11 is in its "7" position, voltage from the selector of its B′ wafer is applied through the number "7" contact to the number "9" contact of wafer C of upper stepping relay SR–10. Hence it will be seen that as stepping relay SR–10 rotates counterclockwise, its rotation will be temporarily arrested when its C wafer selector reaches its "9" contact, since the voltage from the "9" contact will by-pass the self-interrupting contact "*a*" of stepping relay SR–10. Hence stepping relay SR–10 will temporarily halt at its "9" position, and then as bus B is subsequently de-energized by continued rotation of timing motor M, the de-energization of coil M–10 of stepping relay SR–10 will cause the relay to advance one more position counter-clockwise to come to rest in its "8" position. In similar manner, upper stepping relay SR–20 will rotate to a position corresponding to one half of the number (5) represented by the position of lower stepping relay SR–21. Thus upper stepping relays SR–20 and SR–10 will then be in their 2 and 8 positions respectively, which positions correspond to one-half the original decimal number 57, with the remainder neglected.

Since the D′ wafer of each lower stepping relay of second order or higher is connected to the A′ and B′ wafers of its adjacent lower order stepping relay, in manner shown, it will be seen that an A′ wafer will be energized if the next higher order decimal order is even, and that a B′ wafer will be energized if the next higher order decimal digit is odd. The upper stepping relays are connected similarly, so that an A wafer will be energized if the next higher order digit is even, and so that a B wafer will be energized if the next higher order digit is odd. As an aid in understanding how "carry over" is obtained, it should be noted that the connections from the A′ and B′ wafers of SR–11 to wafer C of SR–10 (and the A and B wafer connections from SR–10 to wafer C of stepping relay SR–11) are five positions displaced. Hence SR–10 will home to a position corresponding to a number which is five greater if wafer B′ of SR–11 is energized than if wafer A′ of SR–11 were energized. Since carry-over of a "ten" may be accomplished by adding "five" to the lower order quotient digit, it may be seen that automatic carry-over is instantaneously accomplished, as an integral part of each halving operation.

As continued rotation of timing motor M next energizes bus N, voltage is applied from bus N (see Fig. 5) to the selector of wafer D of upper stepping relay SR–10 to contact 8 of the D wafer, an unconnected contact. Hence no voltage is applied to the KB–2 relay, indicating that the second binary digit is "0" rather than "1." Continued rotation of motor M next energizes bus F, advancing stepping relay SRR one position clockwise, readying it to read the third binary digit. Next, the timing means energizes bus A, applying voltage via conductor 237, self-interrupting contact "*b*" of stepping relay SR–11 to the coil M–11 of the stepping relay. Bus A voltage is also applied through the D wafer of stepping relay SR–20 through conductor 220 to the A wafer of stepping relay SR–10, since stepping relay SR–20 then rests in its "two" position. This voltage is routed through the number "8" contact of wafer A of stepping relay SR–10, since relay SR–10 rests in its "8" position to contact number "5" of wafer C′ of lower stepping relay SR–11. Hence it will be seen that lower stepping relay SR–11 will rotate in a counter-clockwise manner until arriving at its "5" position, at which time the voltage from its C′ wafer will be applied to the coil M–11, by-passing the self-interrupting contact "*b*" of stepping relay SR–11, thereby temporarily halting stepping relay SR–11 at its "5" position, and subsequently advancing the stepping relay one more position counter-clockwise upon later de-energization of bus A. In similar manner stepping relay SR–21 will be translated to its 1 position. Energization of bus N will then determine whether or not the third binary digit is "0" or 1, and then energization of bus F will advance relay SRR in preparation to read the fourth binary digit. As the number in the translator is transferred from the upper group of stepping relays to the lower group, and vice versa, it is halved each time, and at each transfer energization of bus N senses whether a remainder exists. If a remainder does exist, a "KB" relay is energized, indicating that the particular order binary digit is "1" rather than "0."

Referring to Fig. 4, it may be seen that after the operator has pressed the "start" button to start the successive halving operations and bus D is energized, voltage from bus D will be applied to disabling relays as both the upper and lower stepping relays of a particular order translate to their "zero" positions. Shown schematically in Fig. 4 are the selectors and zero contacts of the E and E′ wafers of all of the stepping relays. It will be seen that as soon as stepping relays SR–60 and SH–61 are in their "zero" positions, bus D voltage will be applied to energize disabling relay D–6. Hence in the above example, since the four highest order digits originally entered were "zeroes," disabling relays D–6, D–5, D–4 and D–3 would have been energized as soon as bus D was energized, permanently disabling the four highest order stepping relay groups. As may be seen in Fig. 3, energization of the lowest order disabling relay D–1 disconnects the coils M–10 and M–11 of stepping relays SR–10 and SR–11 preventing any rotation of these relays for the remainder of the translating problem. The contacts of the higher order disabling relays are similarly connected to the coils of the higher order stepping relays. When the original decimal number has been halved a sufficient number of times, all the digits in the quotient will become "zero," and since all stepping relays will then be in their "zero" positions, bus D voltage will be applied to contact "*b*" of relay K–A. Relay K–A will close at the particular point of rotation of shaft 201 at which cam 205 closes its contact "*a*," applying bus D voltage to energize stopping relay K–H and to illuminate "Translation complete" indicator lamp I–TC.

When translation is complete, the operator may then depress switch S–P (shown in Figs. 1 and 5) energizing bus S. Those "KP" relays to which a circuit has been prepared (by closure of a "*b*" contact of a corresponding KB relay) will then be energized. The KP relays may be utilized to operate card punch solenoids, illuminate indicating lamps, to set up the pattern of a signal keyer or pulse generator, or to actuate many other circuits of calculating machines which utilize binary arithmetic. The "KB" relays will maintain themselves energized from bus H until the operator depresses the "enter" key, actuating switch S–E to enter another decimal number to be translated into binary form.

In order that read-out stepping relay SRR will be correctly positioned at all times to actuate or not to actuate the correct KB relays, it must be positioned at its number "1" contact position before translation of the decimal number is started. Relay SRR is provided with an extra contact "*b*," which closes whenever the relay is in its last, or highest number position. If relay SRR is provided with 50 positions, as mentioned above, its contact "*b*" will be closed when relay SRR reaches its 50th position. Relay SRR is also provided with a self-interrupting contact "*a*," which functions in the same manner as the self-interrupting contacts of the other stepping relays. When the operator momentarily depresses "Enter" key switch S–E to enter the decimal numbers into the lower bank of stepping relays, but E is energized. Energization of bus E applies voltage to the coil MRR of relay SRR through its self-interrupting contact, causing the relay to translate (clockwise as shown in Fig. 5) from whichever contact it had stopped on at the end of the last problem around to its last, or 50th position. Closure of contact *b* of relay SRR in the 50th posiiton by-passes self-interrupting contact "*a*," temporarily halting the rotation of relay SRR in the 51st position. When the operator releases "Enter" key switch S–E, de-energizing bus E, relay SRR advances one more step clockwise to arrive at its number "1" contact position. Subsequently, whenever bus F is energized and then de-energized by rotation of cam 203, relay SRR will advance one step.

It will thus be seen that the objects set forth above, among those made apparent from the preceding description, are efficiently attained. Since certain changes may be made in carrying out the above method and in the construction set forth without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. Decimal to binary translating apparatus comprising first and second selective switching relays, each of said relays having a plurality of multi-contact levels, first means for positioning said second relay in accordance with a selected decimal digit, second means connecting said first relay to said second relay to position said first relay in accordance with a number half as great as the number corresponding to the position of said second relay, third means connecting said second relay to said first relay to position said second relay in accordance with a number half as great as the number corresponding to the position of said first relay, cycling switching apparatus for alternately actuating said second and third means, third and fourth selective switching relays each having an individual selector, means connected to each of said first and second relays for applying a voltage to an individual selector if its associated first and second relay is positioned to a position corresponding to an odd number, and a binary digit output device having a plurality of odd order digit indicating devices and a plurality of even order digit indicating devices, the selector connected to said second relay being connected to odd binary order digit indicating devices, said selector connected to said first relay being connected to even binary order digit indicating devices, said switching apparatus being connected to actuate the last-named means before each actuation of said second or said third means.

2. Decimal to binary translation apparatus comprising a pair of multi-pole translatable devices individual to each order of decimal digit to be translated, means for positioning a first device of each pair to a position commensurate with a selected decimal number, timing means, plural circuit means interconnecting each pair of devices to position one device of each pair to a position commensurate with one half of the number represented by the position of the other device if the other device of the next higher order pair is at a position corresponding to an even number or to a position commensurate with five plus one half of the number represented by the position of the other device if the other device of the next higher order pair is at a position corresponding to an odd number, and sensing means operable after each positioning to determine whether the device positioned is at an odd or even position, said timing means being operable to actuate alternately said circuit means and said sensing means.

3. Decimal to binary conversion apparatus comprising first and second selective switching devices each having a plurality of positions representing decimal numbers, means for translating alternately said devices to positions representing successive halves of decimal numbers, means for determining whether each position represents an odd or even number, and output means connected to the last-recited means to be actuated to positions representative of binary digit values.

4. Decimal to binary translating apparatus comprising first and second selective switching devices translatable to positions corresponding to decimal numbers, decimal digit entering means operable to position the first of said devices to a position corresponding to a selected decimal digit, first circuit means interconnecting said devices to position said second device to a position corresponding to the whole number one half as great as the number corresponding to the position of said first device, second circuit means interconnecting said devices to position said first device to a position corresponding to the whole number one half as great as the number corresponding to the position of said second device, first and second selectors, third circuit means operable to apply voltage to said first selector after said first device has been positioned corresponding to an odd number and operable to apply voltage to said second selector after said second device has been positioned corresponding to an odd number, and a plurality of numbered binary order indicating circuits, said even order circuits being connected successively to said first selector, said odd order circuits being connected successively to said second selector, and cycling means to alternately actuate said first and second circuit means and to actuate said third means before each actuation of said first or second circuit means.

5. Decimal to binary translating apparatus comprising in combination, a first plurality of multi-position switching devices, means for positioning said first plurality of multi-position switching devices according to individual decimal digits, a second plurality of multi-position switching devices, first circuit means interconnecting each of said devices of said first plurality to individual multi-position switching devices of said secondary plurality to cause the devices of the first plurality to position the devices of the second plurality according to decimal digits half as great, second circuit means interconnecting the devices of the second plurality to position the devices of the first plurality according to decimal digits half as great, sensing means connected to the lowest order device of each plurality to sense whether its position represents an odd or even number, and timing means operative to actuate said first and second circuit means alternately.

6. Decimal to binary translation apparatus comprising a pair of multi-pole translatable devices individual to each order of decimal digit to be translated, means for positioning a first device of each pair to a position commensurate with a selected decimal number, timing means, first plural circuit means interconnecting the said first device of each pair with the second device of the same pair to position the said second device of the pair to a position commensurate with one half of the number represented by the position of the said first device if the said first device of the next higher order pair is at a position corresponding to an even number or to a position commensurate with five plus one half of the number represented by the position of the said first device if the said first device of the next higher order pair is at a position corresponding to an odd number, second plural circuit means interconnecting the second device of each pair with the first device of the same pair to position the said first device of the pair to a position commensurate with one half of the number represented by the position of the said second device if the said second device of the next higher order pair is at a position corresponding to an even number or to a position commensurate with five plus one half of the number represented by the position of the said second device if the said second device of the next higher order pair is at a position corresponding to an odd number, and sensing means operable after each positioning to determine whether the device positioned is at an odd or even position, said timing means being operable to actuate cyclically said first circuit means, said sensing means, said second circuit means, and said sensing means in the order given.

7. Decimal to binary conversion apparatus comprising first and second selective switching devices each having a plurality of positions representing decimal numbers, means for translating said second device to a position representing one half of the decimal number represented by the first device, means alternating with said first means for translating the said first device to a position representing one half of the decimal number represented by the second device, means for determining whether each position represents an odd or even number, and output means connected to the last-recited means to be actuated to positions representative of binary digit values.

8. In a decimal to binary conversion apparatus employing halving operations, a system for preventing unnecessary halving of zero quantities, comprising multipole, multi-level switches individual to each order of decimal digit to be translated, one level of each said switch having a single pole for closing a connection when the switch is in a position representing the digit zero, said single-pole switch levels being connected serially according to decreasing decimal order, energizing means adapted to be applied to the said level of the switch associated with the highest decimal order to be translated, and disabling means responsive to said energizing means individual to the said level of each switch for disabling said switch from further operation during the conversion process when the said serial connection is completed as far as the respective switch, whereby the switches are disabled in turn beginning with the highest decimal order as each switch in turn comes to zero position as a result of the halving operation.

9. In a decimal to binary conversion system employing halving operations, a system for preventing unnecessary halving of zero quantities, comprising multi-position translatable conversion devices individual to each order of decimal digit to be translated, a train of serially connected switches individual to each order of decimal digit to be translated, arranged in order from the highest decimal order to be translated to the lowest, disabling means individual to each decimal order for disabling from further operation in the conversion process the conversion device associated with the respective decimal order, each said disabling means being connected to the switch associated with the respective decimal order, energizing means connected to the said train at the higher order end for connection to the respective disabling means through said serial train of switches, and means individual to each said switch for closing the switch when the respective conversion device rests in the zero position.

10. In a decimal to binary conversion system employing halving operations, multi-position translatable conversion devices individual to each order of decimal digit to be translated, a train of serially connected switches individual to each other of decimal digit to be translated, arranged in order from the highest decimal order to be translated to the lowest, disabling means individual to each decimal order for disabling from further operation in the conversion process the conversion device associated with the respective decimal order, each said disabling means being connected to the switch associated with the respective decimal order, energizing means connected to the said train at the higher order end for connection to the respective disabling means through said serial train of switches, means individual to each said switch for closing the switch when the respective conversion device rests in the zero position, and means associated with the switch for the lowest decimal order for indicating completion of the conversion operation.

References Cited in the file of this patent

UNITED STATES PATENTS 2,346,616 Saxby ---------------- Apr. 11, 1944